United States Patent [19]

Yamamura

[11] Patent Number: 5,350,148
[45] Date of Patent: Sep. 27, 1994

[54] SEAT SLIDING DEVICE
[75] Inventor: Mitsuji Yamamura, Kosai, Japan
[73] Assignee: Fujikiko Kabushiki Kaisha, Tokyo, Japan
[21] Appl. No.: 890,514
[22] Filed: May 28, 1992
[30] Foreign Application Priority Data May 31, 1991 [JP] Japan .................. 3-129883
May 31, 1991 [JP] Japan .................. 3-129885

[51] Int. Cl.⁵ ............................. B60N 1/08
[52] U.S. Cl. ..................... 248/430; 248/420
[58] Field of Search ........ 248/430, 429, 420; 297/341

[56] References Cited

U.S. PATENT DOCUMENTS 4,760,988  8/1988  Bianchi et al. ............... 248/430

FOREIGN PATENT DOCUMENTS

| 0194049 | 10/1986 | European Pat. Off. . |
| 3030725 | 11/1982 | Fed. Rep. of Germany . |
| 3642441 | 1/1988 | Fed. Rep. of Germany . |
| 2380462 | 8/1978 | France . |
| 2567463 | 1/1986 | France . |
| 2595594 | 9/1987 | France . |
| 2597041 | 10/1987 | France . |
| 49-102814 | 9/1974 | Japan . |
| 58-10927 | 7/1983 | Japan . |
| 63-4842 | 1/1988 | Japan . |
| 64-5623 | 2/1989 | Japan . |
| 2112538 | 9/1990 | Japan . |
| 2258434 | 10/1990 | Japan . |
| 2108380 | 5/1983 | United Kingdom . |
| 2108836 | 5/1983 | United Kingdom . |

Primary Examiner—Alvin C. Chin-Shue
Attorney, Agent, or Firm—Dykema Gossett

[57] ABSTRACT

A seat sliding device consisting essentially of an upper rail fixedly mounted on a seat, a lower rail which is fixedly mounted on a vehicle body and has a substantially identical cross section with that of the upper rail, and a rolling member for assisting said upper rail in sliding along said lower rail. Each upper and lower rail has a substantially flat base portion to be mounted on said seat, a pair of side wall portions provided on both side ends of said base portion and which extend at right angles from said base portion, and a pair of flange portions provided on the each end of said pair of side wall portions and which extend at approximate right angles from said side wall portions. Further, the upper and lower rails engaged with each other, thereby forming a seat sliding body which have a unitary cross section in which a longitudinal length and a horizontal length thereof are identical.

4 Claims, 8 Drawing Sheets

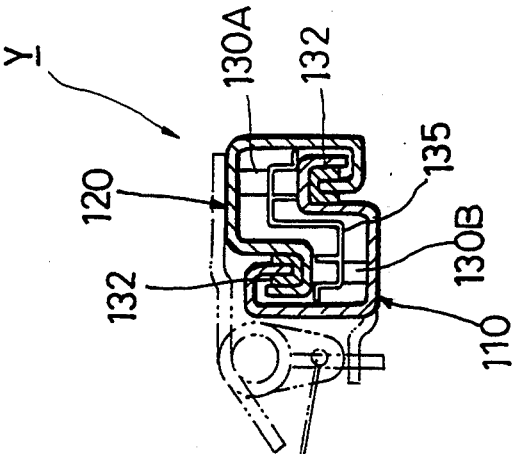
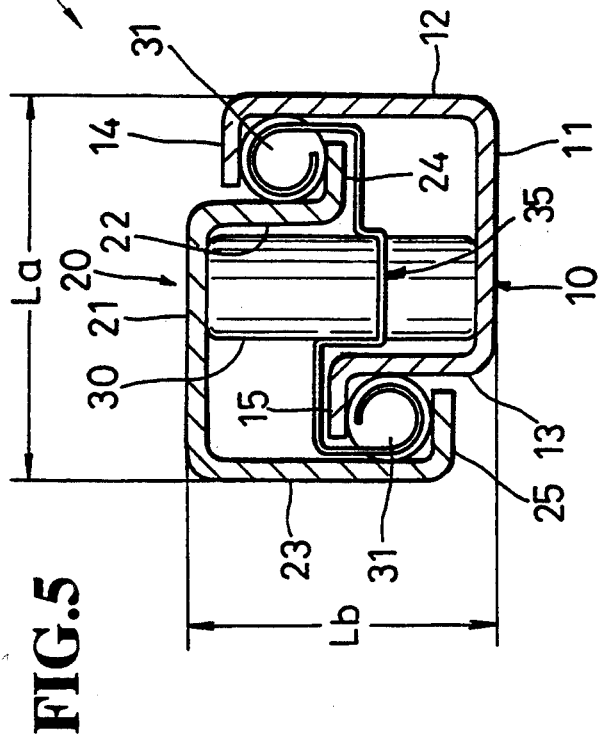
FIG.5
FIG.6
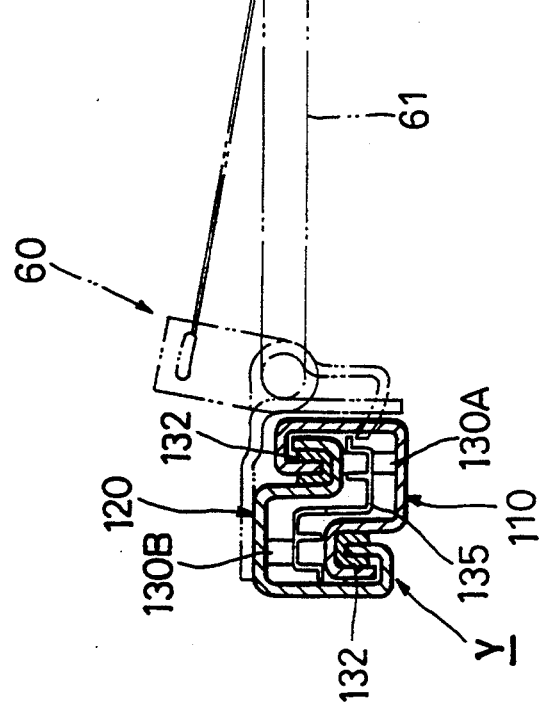

SEAT SLIDING DEVICE

BACKGROUND OF THE INVENTION

The present invention relates to a seat sliding device for sliding a seat of a vehicle.

A kind of seat sliding device for sliding a seat of a vehicle as shown in FIGS. 1 and 2 has been disclosed. A pair of these kind of seat sliding devices are provided for a seat and arranged in parallel with each other in a back-and-forward direction of the seat. The seat sliding device has a pair of rails, a lower rail and an upper rail. The lower rail is fixedly mounted on a vehicle body and the upper rail is fixedly mounted on the seat and slidably engaged with the lower rail by rolling members.

A horizontally settled seat sliding device is shown in FIG. 1, and a longitudinally settled seat sliding device is shown in FIG. 2.

In the horizontally settled seat sliding device, a lower rail 1 mounted on a vehicle body is provided with a lower base 1a which has a somewhat U shaped cross section and a pair of lower flanges 1b which are provided on both upper ends of the lower base 1a and extend toward the outside thereof. The upper rail 2 is directly mounted on a bottom face of the seat, or it can be indirectly mounted on the bottom face of the seat through a supporting member. Further, the upper rail 2 comprises an upper body 2a (which covers an open end of the lower rail 1) and a pair of upper flanges 2b. These upper flanges 2b are provided on both side ends of the upper body 2a, extend downwards, and are engaged with the pair of lower flanges 1b, as shown in FIG. 1. The upper rail 2 is supported by a roller 3 which is provided inside the lower rail 1. A pair of balls 4 are provided in a pair of spaces which are formed by the lower flanges 1b and the engaged upper flanges 2b. These balls receive a pulling force applied to the upper rail 2 in order to slide the upper rail 2 smoothly along the lower rail 1. Further, the balls 4 and roller 3 are retained by a retainer so that all these rolling members are moved together inside a seat sliding body M which is formed by the upper rail 2 and lower rail 1.

FIG. 2 shows a longitudinally settled seat sliding device in which a lower rail 6 and an upper rail 7 are longitudinally settled. In direct contrast to the above described horizontally settled seat sliding device, the lower rail 6 has a structure identical to that of the upper rail 2, and the upper rail 7 has a structure identical to that of the lower rail 1. The other members such as the roller 3, the balls 4, and the retainer 5 in FIG. 2 correspond to those shown in FIG. 1 which have the same reference numbers. An $\overline{N}$ depicts a seat sliding body of the longitudinally settled seat sliding device.

In the above-described horizontally settled seat sliding device, since the cross section of the upper rail 2 has a somewhat rectangular shape as shown in FIG. 1 and the longitudinal length of the upper rail 2 is much shorter than the horizontal length thereof, a longitudinal flexural strength of the upper rail 2 is insufficient. Therefore, when the plate thickness of the upper rail 2 is thickened in order to strengthen the flexural strength thereof, the upper rail 2 becomes heavy and results in a high cost.

In the case of the longitudinally settled seat sliding device, the longitudinal length of the upper rail 7 is wide enough to create a sufficient longitudinal flexural strength in the upper rail 2. However, since the horizontal width of the upper rail 7 cannot be made large enough and the upper rail 7 does not have any support means which work to support the upper rail 7 in a horizontal direction, the horizontal strength of the upper rail 7 may not be sufficient thereby leading to a possible rattly condition in which the upper rail 7 cannot slide smoothly along the lower rail 6.

Moreover, since the structure of the lower rail 1 is not similar to that of the upper rail 2 and the structure of the lower rail 6 is not similar to that of upper rail 7, errors when forming the lower rail 1 or 6 and the upper rail 2 or 7 may occur resulting in a misfitting of the lower rail 1 in the upper rail 2 or of the upper rail 7 in the lower rail 6. In this situation, the upper rail 2 or 7 cannot slide smoothly along the lower rail 1 or 6, respectively.

SUMMARY OF THE INVENTION

In view of the above, an object of the present invention is to solve the aforementioned problems in the prior art through the introduction of a seat sliding device in which longitudinal and horizontal flexural strengths of an upper rail is strong enough so that the upper rail can slide smoothly.

Another object of the present invention is to provide a seat sliding device in which an upper rail can adjust to a lower rail properly, whereby the upper rail can slide smoothly.

The aforesaid objects of the present invention are accomplished through a seat sliding device comprising:
  an upper rail fixedly mounted on a seat and having
    a substantially flat base portion to be mounted on said seat,
    a pair of side wall portions provided on the side ends of said base portion and which extend at right angles from said base portion, and
    a pair of flange portions provided on the each end of said pair of side wall portions and which extend at approximate right angles from said side wall portions;
  a lower rail fixedly mounted on a vehicle body, having a substantially identical cross section with that of said upper rail, and engaged with said upper rail; and
  a rolling member for assisting said upper rail in sliding along said lower rail while rolling inside said upper and lower rails, said upper and lower rails engaged with each other, thereby forming a seat sliding body, said seat sliding body having a unitary cross section in which a longitudinal length and a horizontal length thereof are identical.

In a preferred embodiment, a seat sliding device further comprising more than one rolling member, said pair of flange portions of said upper rail are engaged with said pair of flange portions of said lower rail so as to form a pair of sliding parts, said rolling members, which are provided between the backsides of said sliding parts and said base portions of both the upper rail and the lower rail, so as to support the upper rail at the both horizontal sides thereof.

In the above-described seat sliding device according to the present invention, since said upper rail and said lower rail have substantially identical cross sections and said seat sliding body has a unitary cross section in which a longitudinal length and a horizontal length are identical, sufficient longitudinal and horizontal flexural strengths of an upper rail can be accomplished. More especially, since said upper rail and said lower rail have substantially identical cross sections, errors which occur while forming the upper and lower rails may be identical. As a consequence, an upper rail can adjust to a lower rail satisfactorily, thereby preventing the tartly conditions generated by forming errors. Consequently, a sliding property of an upper rail may be improved significantly.

BRIEF DESCRIPTION OF THE DRAWINGS

FIG. 5 is a fragmentary enlarged cross sectional view corresponding to a seat sliding body $\underline{X}$ in FIG. 4;

FIG. 6 is a cross sectional view of a seat sliding device according to a second embodiment of the present invention;

DETAILED DESCRIPTION OF THE PREFERRED EMBODIMENTS

Embodiments according to the present invention will be described hereinafter using FIGS. 3–11.

Figure 1:
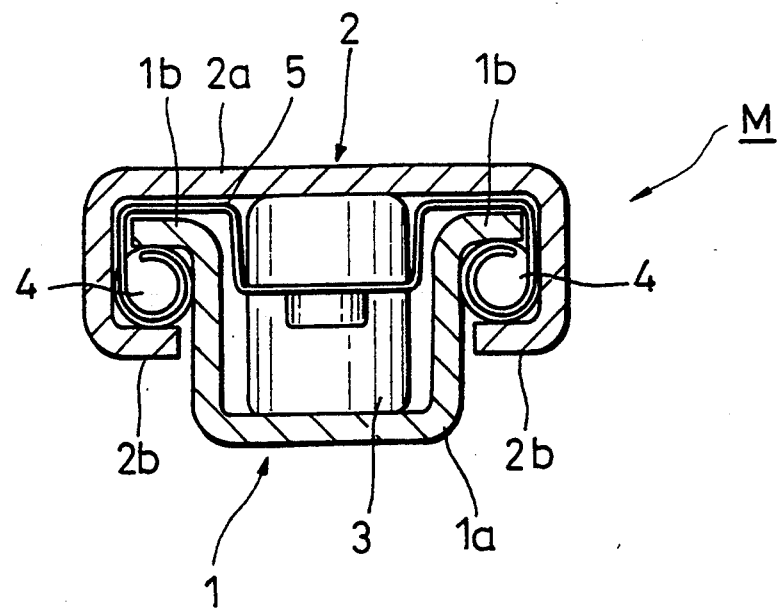
FIG. 1 is a cross sectional view of a horizontally settled seat sliding device according to a conventional example.
Figure 2:
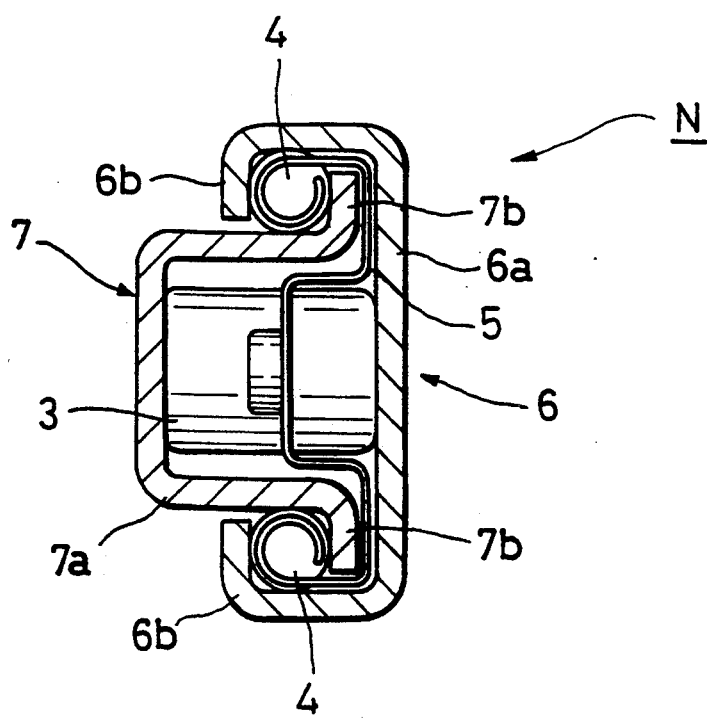
FIG. 2 is a cross sectional view of a longitudinally settled seat sliding device according to a conventional example.
Figure 3:
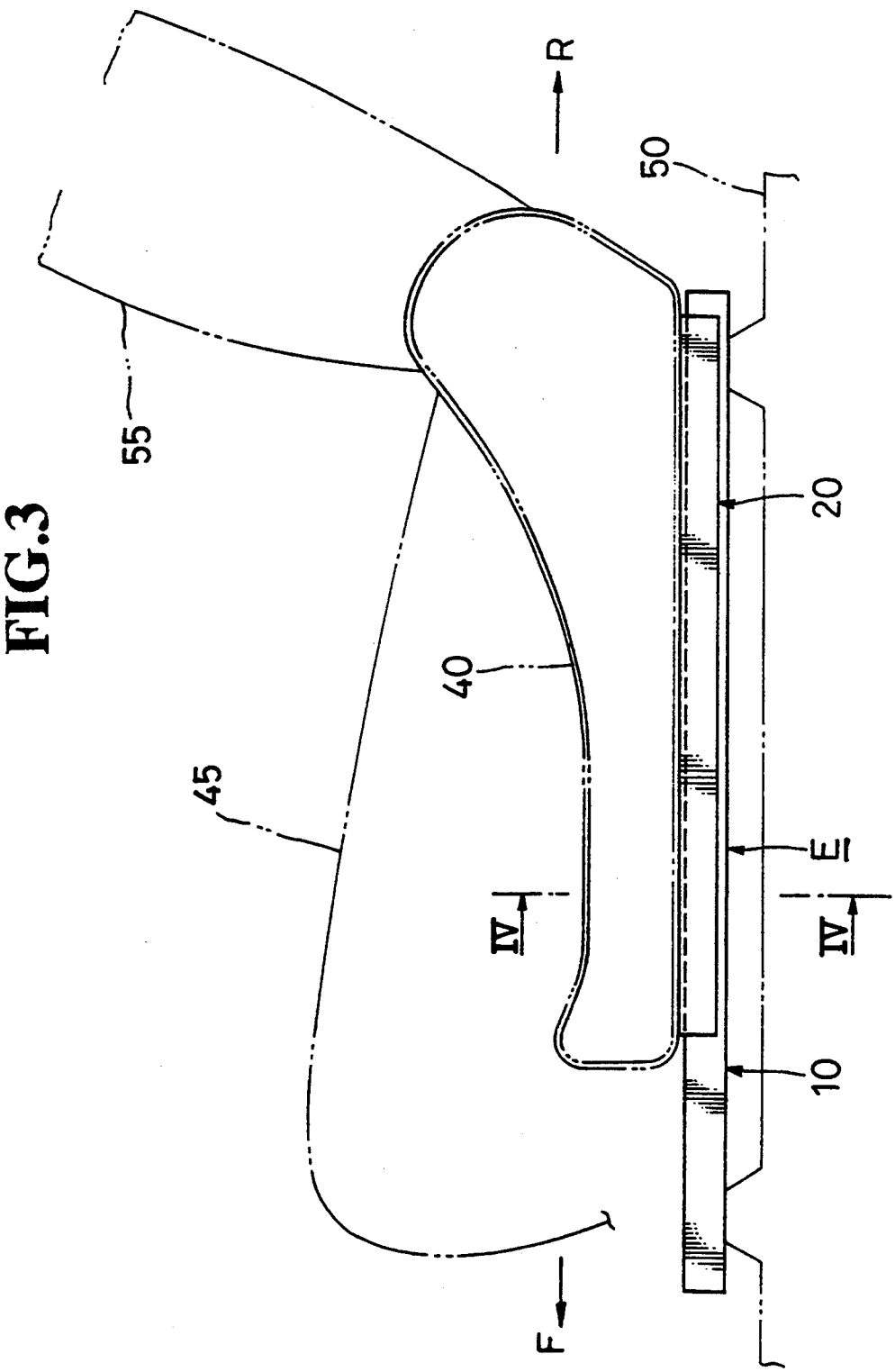
FIG. 3 is an explanatory side elevation view of a seat sliding device according to a first embodiment of the present invention.
Figure 4:
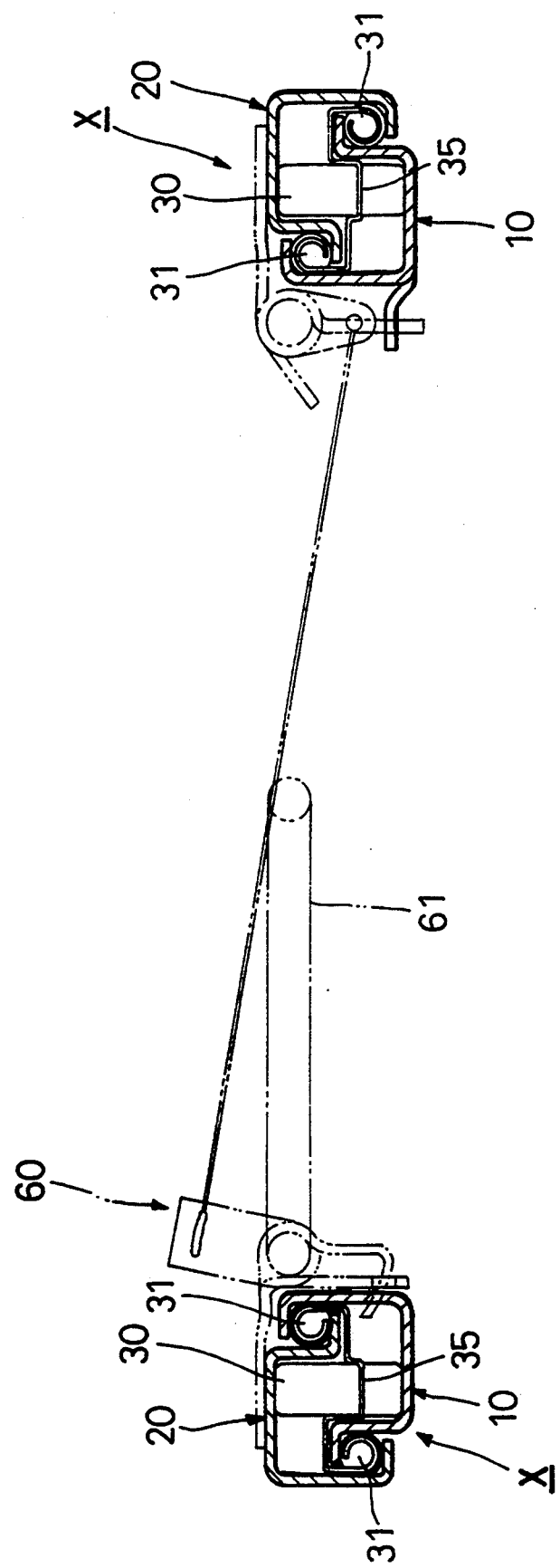
FIG. 4 is a cross sectional view of the seat sliding device taken substantially along lines IV—IV of FIG. 3.

FIGS. 3–5 illustrate the first embodiment of the present invention. In these FIGS. 3–5, FIG. 3 illustrates an explanatory side elevation view of a seat sliding device, FIG. 4 illustrates a cross sectional view of the seat sliding device taken substantially along the lines IV—IV of FIG. 3, and FIG. 5 illustrates a fragmentary enlarged cross sectional view corresponding to the left hand of a $\underline{X}$ portion (i.e. a seat sliding body $\underline{X}$) in FIG. 4.

A seat sliding device $\underline{E}$ comprises a lower rail 10 which is fixedly mounted on a vehicle body, and an upper rail 20 which is slidably engaged with the lower rail 10 by a rolling member, roller 31, and fixedly mounted on a seat as shown in FIG. 3.

In the present invention as shown in FIG. 5, the upper rail 20 characteristically comprises a substantially flat base portion 21, a pair of side wall portions 22, 23 provided on the both side ends of said base portion 21 and which extend at right angles from said base portion 21, and a pair of upper flanges (which are the flange portions in the claims) 24, 25 provided on the each end of said pair of side wall portions 22, 23 and which extend at approximate right angles to said side wall portions 22, 23. The lower rail 10 characteristically has a substantially identical cross section with that of the above described upper rail 20. Further, while the upper rail 20 and the lower rail 10 are engaged with each other forming a seat sliding body $\underline{X}$, the seat sliding body $\underline{X}$ characteristically has a unitary cross section in which a longitudinal length Lb and a horizontal length La are identical as shown in FIG. 5.

Next, a more detailed structure of the first embodiment will be described.

A seat in a vehicle comprises a seat cushion 45 and a seat back 55 as shown in FIG. 3. A pair of base plates 40 (only one of them is illustrated in FIG. 3) are arranged on both lateral sides of the seat cushion 45.

A pair of said lower rails 10 are fixedly mounted on a floor 50 of the vehicle in parallel with each other in a back-and-forth direction (which is shown by a pair of arrows F, R in FIG. 3). Each lower rail 10 comprises the base portion 11 which is abutted against the floor 50 and the pair of side wall portions 12, 13 which are provided on both side ends of said base portion 11 and which extend at right angles from said base portion 11. These side wall portions 12,13 have different lengths, respectively. Further, the lower rail 10 comprises the pair of lower flanges 14, 15 which are provided on each end of the pair of side wall portions 12, 13 and which extend at approximate right angles from said side wall portions 12, 13. Namely, the pair of lower flanges 14, 15 horizontally extend in identical directions respectively. The pair of lower rails 10 are symmetrically arranged in parallel with each other in a lateral direction of the seat as shown in FIG. 4.

Also, while the pair of upper rails 20 have substantially identical cross sections with those of the lower rails 10, the pair of upper rails 20 are symmetrically arranged in parallel with each other in a lateral direction of the seat as shown in FIG. 4. In this situation, the base portion 21 of the each upper rail 20 is fixedly mounted on the base plate 40 of the seat cushion 45. The upper rails 20 are supported by rollers 30 which are arranged inside the lower rails 10.

For the seat sliding body $\underline{X}$ mentioned above, a pair of bails 31 are arranged between the lower flanges 14, 15 and the upper flanges 24, 25 while the upper flanges 24,25 are abutted against the lower flanges 14, 15. In this first embodiment, the horizontal length La and the longitudinal length Lb of the cross section with respect to the seat sliding body $\underline{X}$ are identical.

In connection with the above, a reference number 60 in FIG. 4 depicts a lock device and a reference number 61 depicts an operation lever. The lock device 60 including the operation lever 61 is provided for either one of the seat sliding bodies $\underline{X}$, and lock operation or releasing lock operation thereof can be executed by shifting the operation lever 61 (wherein the operation details thereof will be omitted). A retainer 35 is provided in the seat sliding body $\underline{X}$ so that the roller 30 and the balls 31 can move together inside the seat sliding body $\underline{X}$ while being supported by the retainer 30.

Next, actions and effects thereof in the first embodiment will be described.

The roller 30 supports a weight which weighs through the seat cushion 45 upon the upper rail 20 in an identical manner to that of a conventional embodiment. Further, a pulling force which is applied to the upper rail 20 in a direction along the seat sliding body $\underline{X}$ is received by balls 31 which are arranged between the lower flanges 14, 15 and the upper flanges 24, 25.

In this first embodiment, since the horizontal length La and longitudinal length Lb of the seat sliding body X are the same, the horizontal length of upper rail 20 can be larger than that of a conventional upper rail of a longitudinal settled seat sliding device, and the longitudinal length of upper rail 20 can be larger than that of a conventional upper rail of a horizontal settled seat sliding device. Therefore, sufficient longitudinal and horizontal flexural strengths of the upper rail 20 can be accomplished. Moreover, since the upper rail 20 and the lower rail 10 have substantially identical cross sections, errors which occur in upper rail formations and lower rail formations will be the same. As a consequence, the upper rail 20 can adjust to the lower rail 10 satisfactorily, preventing the tartly conditions generated by forming errors. Consequently, a sliding property of the upper rail 20 may be improved significantly.

Figure 7:
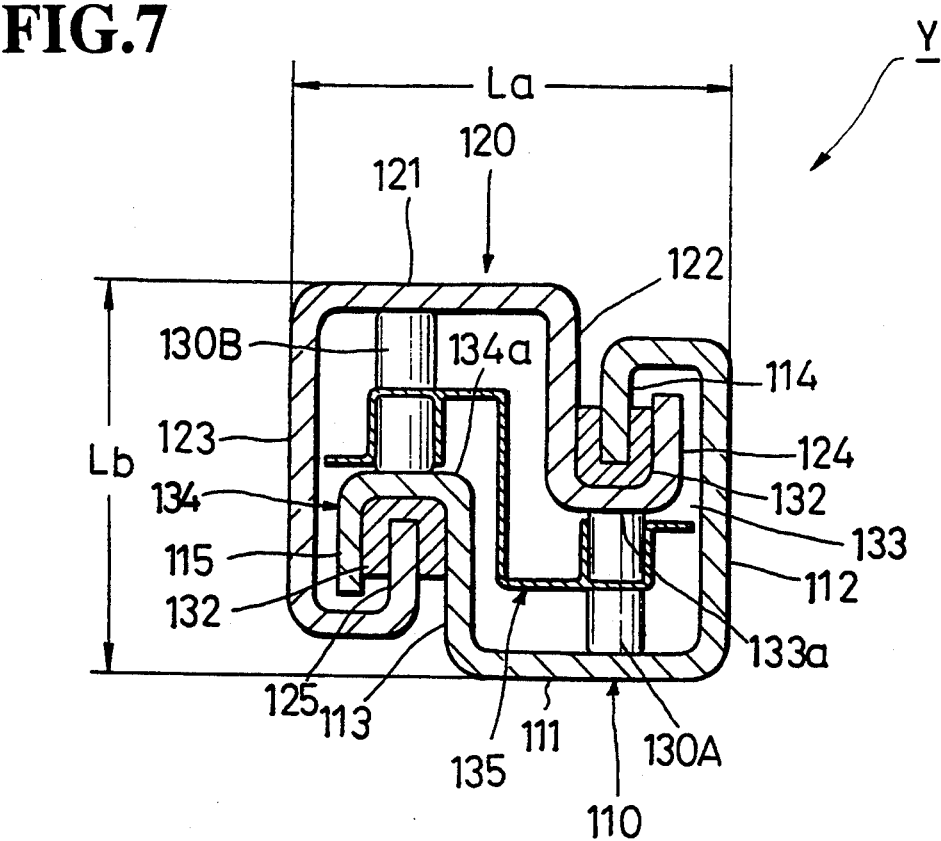
FIG. 7 is a fragmentary enlarged cross sectional view corresponding to a seat sliding body $\underline{Y}$ in FIG. 6.
Figure 8:
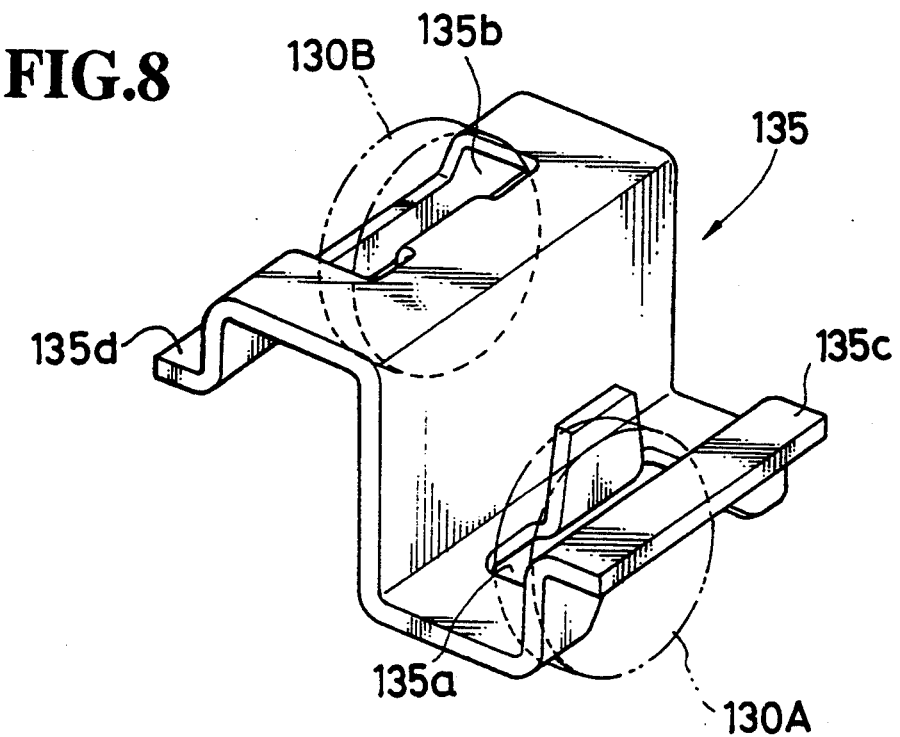
FIG. 8 is a perspective view of a retainer whose sectional view is illustrated in FIG. 7.

FIGS. 6–8 relate to the second embodiment according to the present invention. In these Figures, FIG. 6 illustrates a cross sectional view of a seat sliding device which is similar to FIG. 4, FIG. 7 is a fragmentary enlarged cross sectional view corresponding to the left hand of a Y portion (i.e. a seat sliding body Y) in FIG. 6, and FIG. 8 is a perspective view of a retainer whose sectional view is illustrated in FIG. 7.

A lower rail 110 and an upper rail 120 comprise substantially flat base portions 111, and 121, two pairs of side wall portions 112, 113, and 122, 123 which are provided on both side ends of the base portions 111, 121 and which extend at right angles from the base portions 111, 121, respectively. Further, the lower rail 110 and the upper rail 120 comprise two pairs of upper flanges 114, 115, and 124, 125 which are provided on each end of the two pairs of side wall portions 112, 113, and 122, 123. These two pairs of upper flanges 114, 115, and 124, 125 extend at approximate right angles to the side wall portions 112, 113, and 122, 123, respectively, and further extend at approximate right angles thereto. Furthermore, the pairs of lower flanges 114, 115 and the upper flanges 124, 125 are engaged with each other through a pair of sliders 132 so as to form a pair of sliding parts 133, 134. Moreover, a pair of rollers 130A, 130B (as rolling members in the claims of the present invention) are arranged between the backsides of the sliding parts 133, 134 and the base portions 111, 121 (which are of the upper rail 120 and the lower rail 110, respectively). These rollers 130A, 130B are supported by a retainer 135 so that the rollers 130A, 130B can move inside the seat sliding body together. A pair of rollers 130A, 130B may be arranged inside the seat sliding body Y at a predetermined interval.

The retainer 135 is curved into a S like shape including a pair of U like shaped portions and is arranged horizontally in the seat sliding body Y. Further, the retainer 135 has a pair of protruding portions 135c, 135d which protrude in horizontal directions from the U like shaped portions, and supporting holes 135a, 135b which are provided in the U like shaped portions so that the rollers 130A, 130B can be fitted therein. Since the retainer 13S has the pair of protruding portions 135c, 135d, a horizontal position of the retainer 135 may be maintained in the seat sliding body Y. Stoppers (which are not shown in any Figures) are provided on either the lower rail 110 or the upper rail 120 to limit an extent of the upper rail's movement in a back-and-forward direction of the seat.

Next, actions and effects thereof in the second embodiment will be described.

A weight which is applied to the upper rail 120 through the seat cushion 45 may be received by the pair of rollers 130A, 130B. A pulling force which is applied to the upper rail 120 is received by the pair of sliders 132 which are provided between the lower flanges 114, 115 and the upper flanges 124, 12S.

Since the upper rail 120 is supported at the both horizontal sides thereof by the pair of rollers 130A, 130B, even while a weight is applied to only one horizontal side of the upper rail 120, the upper rail 120 may be prevented from tilting to the side to which the weight is applied and from being bent. Consequently, the upper rail 120 can slide smoothly along the lower rail 110. Furthermore, since the horizontal length of the rollers 130A, 130B may be narrowed as much as possible, it will be possible for the rollers 130A, 130B to be molded by a press mold process, resulting in a cheaper molding cost compared with molding costs for conventional upper rails.

Figure 9:
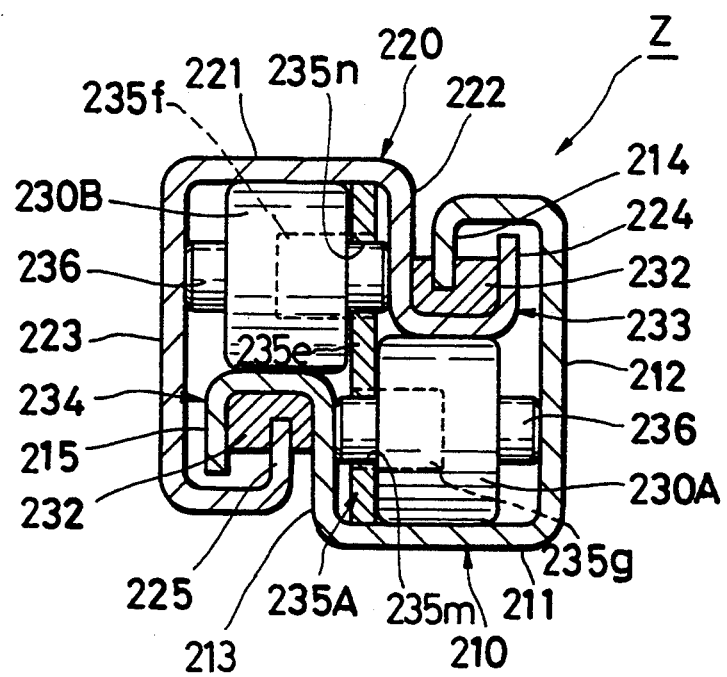
FIG. 9 is a cross sectional view of a seat sliding device according to a third embodiment of the present invention.
Figure 10:
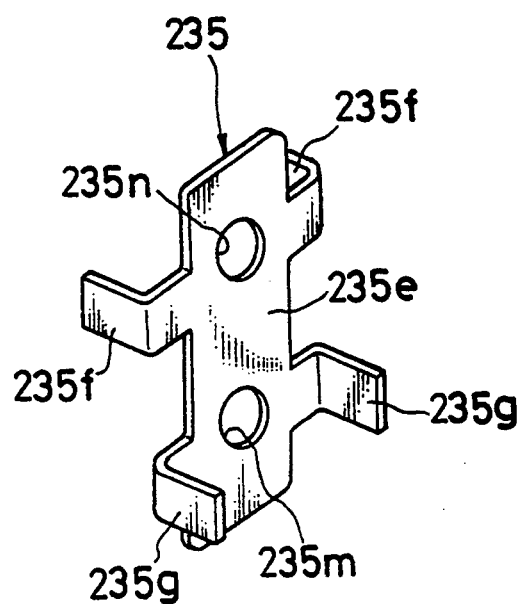
FIG. 10 is a perspective view of a retainer whose sectional view is illustrated in FIG. 9.

FIGS. 9–10 relate to the third embodiment according to the present invention. In these Figures, FIG. 9 is a fragmentary enlarged cross sectional view, and FIG. 10 is a perspective view of a retainer whose sectional view is illustrated in FIG. 9.

In this embodiment, a pair of rollers 230A, 230B have protruding axles 236 which protrude from the side face thereof at rotational axes positions thereof so as to abut against side wall portions 212, 213 and 222, 223 of an upper rail 220 and a lower rail 210, respectively. In this manner, the horizontal movements of the rollers 230A, 230B in a seat sliding body Z may be held with stability. A retainer 235 includes a base portion 235e, which is arranged longitudinally in the seat sliding body Z, and two pairs of protruding portions 235f, 235g as shown in FIG. 10. The protruding portions 235f and 235g are provided on the upper and bottom side ends of the base portion 235e and are bent at right angles to the base portion 235e in opposite directions. A pair of supporting holes 235n, 235m are provided in the base portion 235e. One side of each of the protruding axles 236 of the rollers 230A, 230B is inserted into and fitted in the supporting holes 235n, 235m, respectively, whereby the rollers 230A, 230B can move in the back-and-forth direction in the seat sliding body Z together.

In this third embodiment, one side of each of the protruding axles 236 of the rollers 230A, 230B is inserted into and fitted in the supporting holes 235m, 235n of the retainer 235A, respectively, in advance, and then these rollers 230A, 230B and the retainer 235 can be arranged together inside the seat sliding body Z. However, in the second embodiment, after the rollers 130A, 130B are arranged inside the seat sliding body Y, the retainer 135 is arranged inside the seat sliding body Y, thereby covering the rollers 130A, 130B. Therefore, in the third embodiment, assembling of the rollers 230A, 230B and the retainer 235 may be significantly improved, while being made simple and easy.

Figure 11:
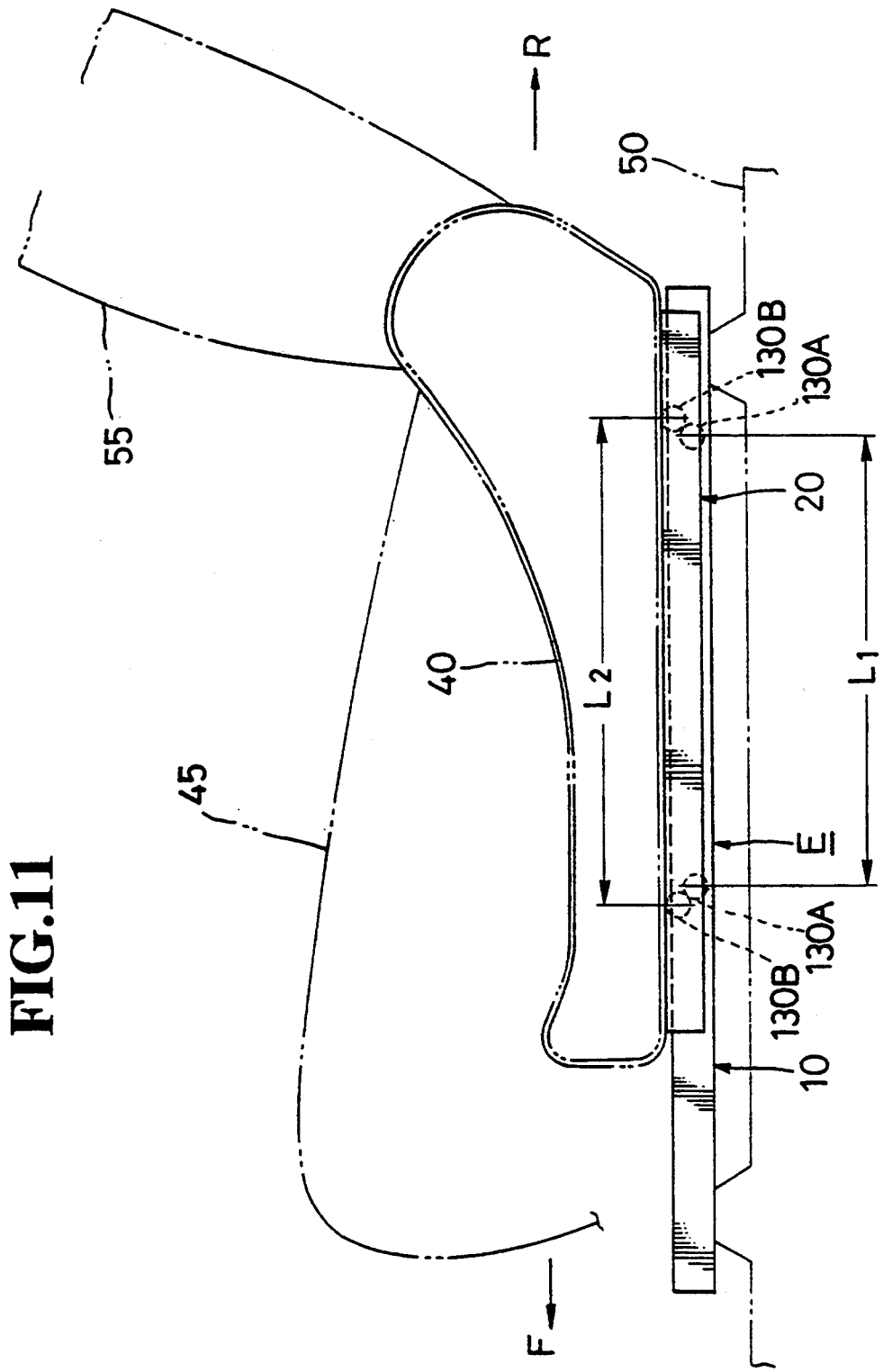
FIG. 11 is an explanatory side elevation view of a seat sliding device according to a fourth embodiment of the present invention.
Figure 12:
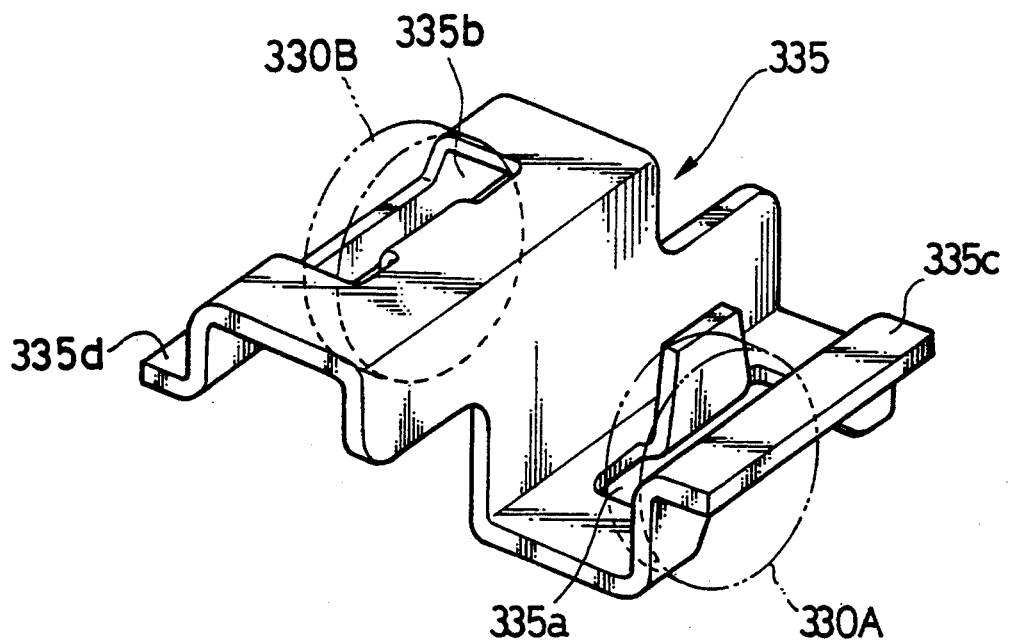
FIG. 12 is a perspective view of a retainer according to the fourth embodiment of the present invention.

FIGS. 11–12 relate to the fourth embodiment according to the present invention. In these Figures, FIG. 11 illustrates an explanatory side elevation view of a seat sliding device, and FIG. 12 illustrates a perspective view of a retainer 335.

The retainer 335 has a transformed shape of the retainer 135. Similar to the retainer 135, the retainer has a pair of supporting holes 335a, 335b, but the locations of the supporting holes 335a, 335b are changed so that the roller 130B arranged upwards relative to the roller 130A in the seat sliding body Y is located outwards relative to the roller 130A in a direction in which the upper rail 120 slides, as shown in FIG. 11. Namely, the roller 130A arranged downwardly relative to the roller 130B in the seat sliding body $\underline{Y}$ is located inwards relative to the roller 130B in a direction in which the upper rail 120 slides. In accordance with the relative locations of the rollers 130A, and 130B, in the retainer 335, the supporting hole 335b in which the upward arranged roller 130B is fitted is located outwards relative to the supporting hole 335a. Namely, the supporting hole 335a in which the downwardly arranged roller 130A is fitted is located inwards relative to the supporting hole 335b.

In this fourth embodiment, a length $L_2$ made between the pair of rollers 130B which are arranged inside the seat sliding body $\underline{Y}$ in the back-and-forth direction of the vehicle can be larger than a length $L_1$ made between the pair of rollers 130A which are also arranged inside the seat sliding body $\underline{Y}$. This arrangement of the rollers 130A, 130B, and retainer 335 in the seat sliding body $\underline{Y}$, therefore, may prevent rattly conditions of the upper rail 120 which are generated while the upper rail 120 slides along the lower rail 110. Moreover, in the fourth embodiment, assembling of the rollers 130A, 130B and the retainer 335 into the seat sliding body $\underline{Y}$ may be further improved.

Figure 13:
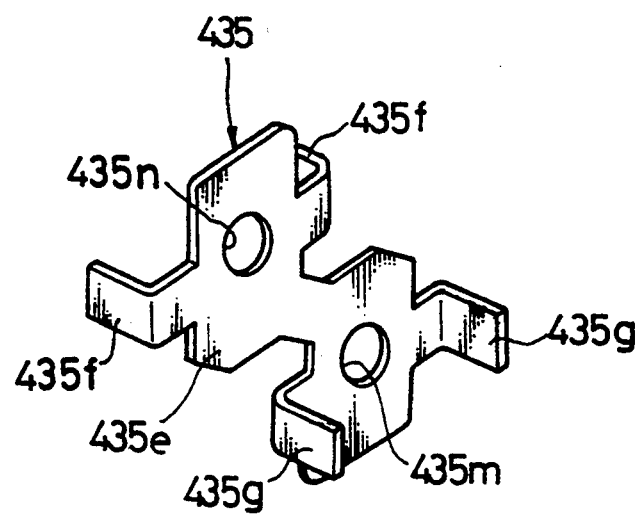
FIG. 13 is a perspective view of a retainer according to a fifth embodiment of the present invention.

FIG. 13 is a perspective view of a retainer according to the fifth embodiment of the present invention.

The retainer 435, comprising a pair of supporting holes 435n, 435m, has a transformed shape of the retainer 235. Similar to the above described retainer 335 in the fourth embodiment, the supporting hole 435n which is arranged relatively upwards in the retainer 435 is located outwards relative to the supporting hole 435m in a direction in which the upper rail 220 slides so as to accomplish a similar effect of the fourth embodiment.

What is claimed is:

1. A seat sliding device, comprising:
   an upper rail fixedly mounted on a seat and extending in a third direction, said seat sliding in said third direction, said upper rail having a substantially flat base portion, being mounted on said seat;
   two side wall portions;
   two flange portions;
   said upper rail having an upper rail cross section defined by said base portion extending in a first direction which is approximately perpendicular to said third direction, said base portion having two side ends, said side wall portions extending from said side ends of said base portion, respectively, in a second direction which is approximately perpendicular to said first and third directions, respectively, said side wall portions having respective ends distal from said base portion, said flange portions extending from said distal ends of said side wall portions, respectively, at least in the first direction;
   a lower rail being fixedly mounted on a vehicle body having a substantially flat base portion, two side wall portions and two flange portions, and having a lower rail cross section that is substantially identical to said upper rail cross section taken along said first and second directions; and
   a rolling member for assisting said upper rail when sliding along said lower rail in said third direction by rolling inside said upper and lower rails; and wherein, said upper and lower rails form a seat sliding body while engaging with each other in said third direction, said seat sliding body having a unitary cross section taken in said first and second directions, said unitary cross section being defined by a first length in said first direction and a second length in said second direction, said first and second lengths being approximately equal wherein said rolling member includes a pair of rolling members; a retainer for supporting said pair of rolling members in said seat sliding body, said retainer having a base portion and first and second supporting holes, said base portion of said retainer being arranged in said seat sliding body in said second direction, said first and second supporting holes being provided in said second direction in said base portion of said retainer; and wherein, said rolling members have first and second shafts protruding from side faces on said rolling members at positions of the rotational axis thereof, said first shaft abutting against said side wall portions of said upper and lower rails, said second shaft being fitted in said supporting holes of said retainer.

2. A seat sliding device as set forth in claim 1, said flange portions of said upper rail are engaged with said flange portions of said lower rail, a pair of sliding parts being located between said upper and lower flange portions; and
   said pair of rolling members are provided between inner sides of said pair of said sliding parts and said base portions of said upper and lower rails and move in said third direction.

3. A seat sliding device as set forth in claim 1, wherein said first and second supporting holes of said retainer have different positions in said third direction.

4. A seat sliding device as set forth in claim 3, wherein said retainer includes first and second retainer members in said seat sliding body, said first and second retainer members being located proximate to first and second side ends of said seat sliding body in said third direction, respectively, and wherein, one of said supporting holes of said first retainer member, which is located closer to said seat than said second supporting hole, is arranged closer to said first side end than said second supporting hole, and one of said supporting holes of said second retainer member, which is located closer to said seat than the other said supporting hole, is arranged closer to said second side than the other said supporting hole.

* * * * *